United States Patent
Baxter et al.

(10) Patent No.: US 9,056,791 B2
(45) Date of Patent: Jun. 16, 2015

(54) CEMENT COMPOSITIONS CONTAINING NANO SIZED BOEHMITE CRYSTALLITES

(71) Applicants: Steven Baxter, Springville, UT (US); Jeff Fenton, Katy, TX (US); Reiner Glockler, St. Michaelisdonn (DE)

(72) Inventors: Steven Baxter, Springville, UT (US); Jeff Fenton, Katy, TX (US); Reiner Glockler, St. Michaelisdonn (DE)

(73) Assignee: Sasol North America, Inc., Houston, TX (US)

( * ) Notice: Subject to any disclaimer, the term of this patent is extended or adjusted under 35 U.S.C. 154(b) by 0 days.

(21) Appl. No.: 14/179,264

(22) Filed: Feb. 12, 2014

(65) Prior Publication Data
US 2014/0224156 A1    Aug. 14, 2014

Related U.S. Application Data

(60) Provisional application No. 61/764,740, filed on Feb. 14, 2013.

(51) Int. Cl.
*C04B 14/30* (2006.01)
*C04B 28/04* (2006.01)

(52) U.S. Cl.
CPC ............... *C04B 14/303* (2013.01); *C04B 28/04* (2013.01)

(58) Field of Classification Search
CPC ...................................... C04B 14/303
See application file for complete search history.

(56) References Cited

U.S. PATENT DOCUMENTS 4,416,699 A * 11/1983 Jacobson ............... 106/443

* cited by examiner

*Primary Examiner* — Paul Marcantoni
(74) *Attorney, Agent, or Firm* — Bushman Werner, P.C.

(57) ABSTRACT

A composition comprising cement and nano-sized crystalline particles of boehmite alumina or nano-sized crystalline particles of boehmite alumina which have been modified by the inclusion of silicon oxide, calcium oxide, or magnesium oxide. The boehmite alumina has an average crystallite size from about 2 nm to about 80 nm and a content of non-crystalline alumina of less than about 25 mol percent based on total aluminum.

15 Claims, 3 Drawing Sheets

CEMENT COMPOSITIONS CONTAINING NANO SIZED BOEHMITE CRYSTALLITES

CROSS-REFERENCE TO RELATED APPLICATIONS

This application claims priority to U.S. application Ser. No. 61/764,740, filed Feb. 14, 2013, the disclosure of which is incorporated herein by reference for all purposes.

FIELD OF THE INVENTION

The present invention relates to concrete/cement compositions and, more specifically, to such compositions which exhibit enhanced compressive strength and reduced chemical shrinkage.

BACKGROUND OF THE INVENTION

Concrete is one of the most widely used materials for construction. It is used in the construction of roads, buildings, and numerous other structures.

In an effort to make stronger concrete there is on going research devoted to increasing the mechanical properties of concrete/cement. In this regard, it is known that the addition of nano-silica particles to cement, increases density, reduces porosity, improves the bond between the cement matrix and aggregates, all of which result in a concrete that shows higher compressive and flexural strength.

Early age cracking can be a significant problem in concrete. Volume changes in concrete drive tensile stress development when they are restrained. Accordingly, cracks can develop when the tensile stress exceeds the tensile strength, which is generally only ten percent of the compressive strength. At early stages, the strength is still developing while stresses are generated by volume changes. Controlling the variables that effect volume change can minimize high stresses and cracking.

The volume of concrete begins to change shortly after it is cast. Early volume changes, within twenty-four hours, can influence tensile stress and crack formation in hardened concrete. Chemical shrinkage occurs due to the reduction in absolute volume of solids and liquids in the hydrating paste. Chemical shrinkage continues to occur as long as cement hydrates. After the initial set, the paste resists deformation, causing the formation of voids in the microstructure.

Autogeneous shrinkage is the dimensional change of cement paste, mortar, or concrete caused by chemical shrinkage. When internal relative humidity is reduced below a given threshold, self-desiccation of the paste occurs resulting in a uniform reduction of volume.

SUMMARY OF THE INVENTION

In one aspect, the present invention provides a composition comprising cement and nano-sized crystalline particles of boehmite alumina or nano-sized crystalline particles of boehmite alumina which have been modified by the inclusion of silicon oxide, calcium oxide, or magnesium oxide.

In another aspect, the present invention provides a composition of cement and nano-sized crystalline boehmite particles, which shows enhanced compressive strength.

In still a further aspect, the present invention provides a composition of cement and nano-sized crystalline particles of boehmite which exhibits reduced chemical shrinkage.

These and further features and advantages of the present invention will become apparent from the following detailed description, wherein reference is made to the figures in the accompanying drawings.

DETAILED DESCRIPTION OF PREFERRED EMBODIMENTS

Figure 1:
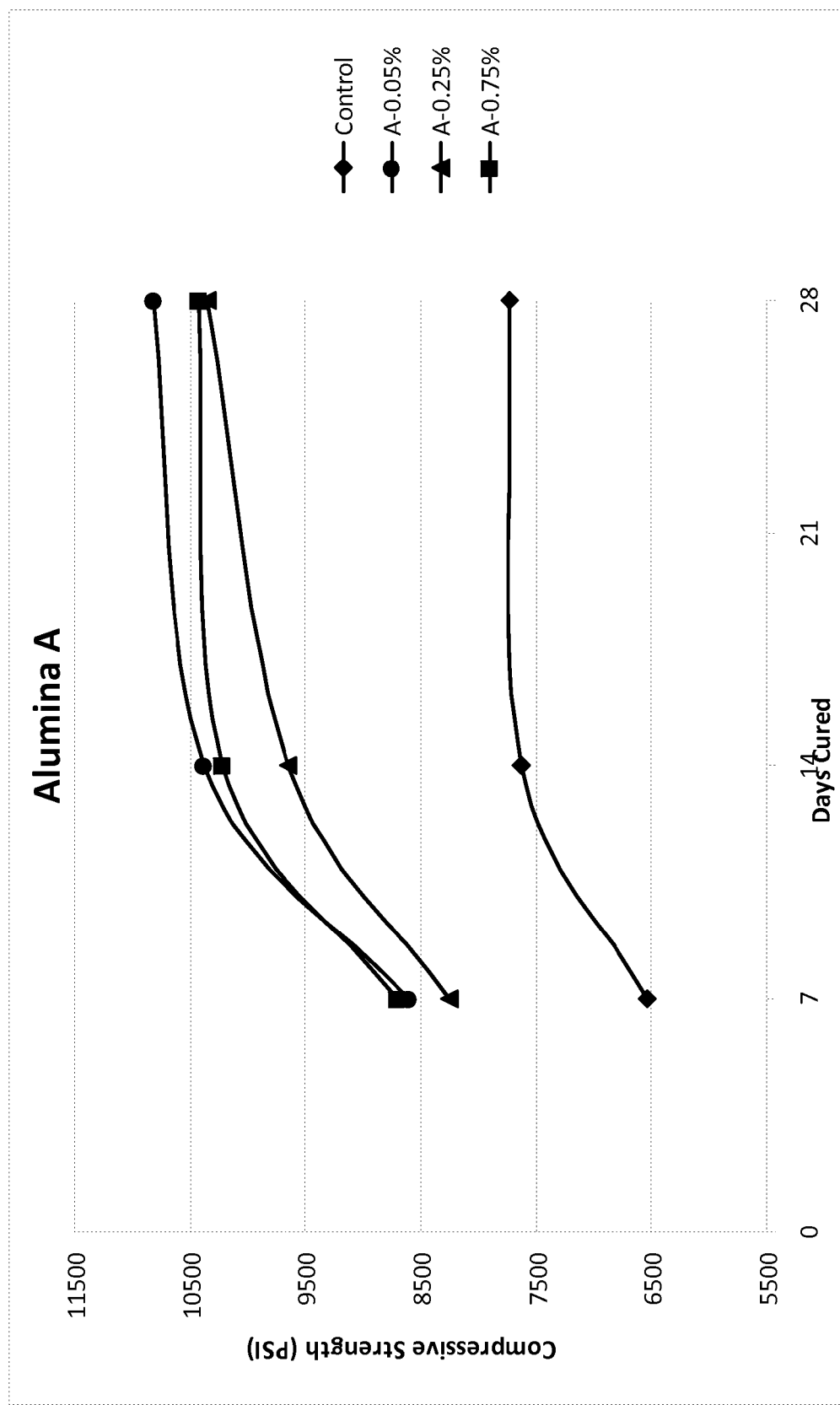
FIG. 1 is a graph showing the effect of compressive strength on cement containing various amounts of nano-sized crystalline boehmite alumina.

The nano-alumina used in the cement compositions of the present invention are of the boehmite crystal form and will generally have an agglomerated particle size of less than 350 nm as for example from about 20 nm to about 350 nm, a calcined surface area of from about 2 $m^2/g$ to about 300 $m^2/g$, especially from about 35 $m^2/g$ to about 275 $m^2/g$ a purity of greater than about 99% by weight, an average crystallite size of the 020 plane of from about 2 nm to about 80 nm, preferably from about 3 nm to about 60 nm. The nano-alumina has a content of non-crystalline alumina less than about 25 mole percent of total aluminum. Alternatively, the content of non-crystalline alumina can be less than about 10 mole percent of total aluminum, less than about 5 mole percent of total aluminum, or less than about 2 mole percent of total aluminum. It is to be understood that with respect to the particle size, this is the agglomerated particle size as measured in an aqueous dispersion.

The combination of the highly crystalline boehmite having the above described specific particle size and surface area makes it possible to employ smaller quantities of the nano-sized alumina to the cement composition resulting in similar/greater improvements in compressive strength and/or desirable alterations to the rate of chemical shrinkage then what is generally known in the prior art. Indeed, the prior art does not recognize or teach that the combination of the particular type of alumina, surface area, and crystallinity, as described herein with respect to the present invention, would provide any improvements in either compressive strength and/or control of shrinkage rate.

The above mentioned agglomerate size of the material of this invention is measured by the scattering of light directed at a dilute dispersion of the material in acidic water (Light Scattering Method). Dynamic light scattering methods, sometimes referred to as photon correlation spectroscopy or quasi-elastic light scattering, which are capable of measurements in the range of 1-1000 nm, are most suitable for this measurement. As is well known, these dynamic light scattering methods are commonly used to determine the size distribution profile of small particles in suspension, polymers in solution, etc. While measurement by other methods may be used and result in agglomerate sizes outside the above ranges, it is to be understood that as long as the agglomerate size falls within the above range when measured by the Light Scattering Method, the material is within the scope of the present invention.

Surface area is determined by the BET method, using nitrogen desorption according to methods well known to those skilled in the art.

Purity is measured by various means well known to those skilled in the art. Inductive coupled plasma or atomic absorption are two commonly used methodologies.

Average crystallite size is measured by x-ray diffraction line broadening as calculated by the Scherrer equation, well known to those skilled in this art. While boehmite alumina exhibits several diffraction peaks, the peak corresponding to the 020 plane is particularly convenient for analysis as it is free of interferences from other diffraction planes.

The content of non-crystalline alumina is measured by $^{27}$Al NMR on samples in the dispersed phase. Due to very long relaxation times of the crystalline component, only the soluble and non-crystalline fraction of the material is detected in solution phase analyses. These non-crystalline components consist of either the octahedral $[Al(H_2O)_3]^{3+}$ ion or oligomeric species of the form $\{[Al(OH)_{2.5}]^{0.5+}\}_n$. Chemical shifts of these substances are well known and the content of such non-crystalline species can be determined by digital integration of signal strength vs. an internal standard.

Crystalline boehmite aluminas obtained from alkoxide precursors can easily be prepared as stable, non-settling dispersions in water through the addition of small amounts of acid, generally a monovalent acid. These crystalline boehmites may optionally be subjected to hydrothermal treatment for the purpose of increasing the average crystallite size of the boehmite, thus rendering the material suitable for dispersion at higher concentrations. While the crystalline boehmite alumina and pseudoboehmite aluminas utilized in this invention may be prepared from the hydrolysis of aluminum alkoxides, it is to be understood that the invention is not so limited. The invention may be used with boehmite aluminas made by other processes such as the hydrothermal transformation of a mixture of boehmite and gibbsite, a mixture of boehmite and bayerite, or combinations thereof provided that the boehmite alumina has the parameters as set forth above regarding crystallinity.

Crystalline boehmite aluminas which have been modified by the addition of up to 10% of other metal oxides may also be utilized in this invention. Boehmites containing calcium oxide, magnesium oxide, or silica added in such a manner and quantity so as to not interfere with the ability to form stable dispersions in water are suitable for this invention provided that the boehmite alumina has the parameters as set forth above regarding crystallinity.

In general, the water-to-cement ratio in the compositions of the present invention can range from about 0.28 to about 0.56, a ratio of from about 0.35 to about 0.45 being preferred.

The compositions of the present invention will contain the nano-alumina in an effective amount, i.e., an amount that increases compressive strength, reduces the rate of as well as the final amount of chemical shrinkage, or both. In particular, preferred amounts are from about 0.001% to about 1.5%, preferably from about 0.001% to about 1% by weight, more preferably from about 0.05% to about 0.75% by weight, based on the weight of cement and excluding any additional components, e.g., aggregates.

It will be understood that while the present invention is described with respect to cement, that term, as used herein, includes concrete containing aggregates and other additives, commonly added to cement to form concrete. In this regard, as is well known to those skilled in the art, cement is generally made from limestone, calcium, silicon, iron, and aluminum compounds among others while concrete is a masonry material that uses cement to bind together aggregate such as crushed stone, rock, sand, etc. and can contain other components to impart certain desired properties to the cement.

To demonstrate the invention, the following non-limiting example is presented:

EXAMPLE

The cement employed was a Type I/II OPC cement—800 lbs cy. In all cases, the water-to-cement ratio was 0.40 by weight. Two different crystalline boehmite aluminas were employed. Formulations of various amounts of cement and the respective boehmite aluminas were made and tested. The aluminas employed were made by the hydrolysis of aluminum alkoxides. One of the aluminas, identified as Alumina A, has an agglomerated particle size of >200 nm, a specific calcined surface area (m$^2$/g) of >60, and a purity of >99.80%. The other alumina, identified as Alumina B has an agglomerated particle size of >100 nm, a specific calcined surface area (m$^2$/g) of 250 and purity of >99.80%. Preferably, the aluminas used herein comprise a hydrothermally aged material.

The formulations were subjected to various tests to determine the effect on compressive strength and chemical shrinkage.

Referring first to FIG. 1, there is shown the effect of the addition of Alumina A at various amounts on the compressive strength of the cement. As can be seen from FIG. 1, as compared to a control containing no alumina, the addition of only small amounts of Alumina A showed a marked increase in compressive strength as compared to the control. In fact, and as can be seen from FIG. 1, optimum increase in compressive strength is achieved when the alumina is present in an amount of from about 0.75% by weight or less. In this regard, note that maximum increase in compressive strength was achieved when the alumina content ranged from about 0.05% to about 0.75% by weight, a preferred amount. Note for example that when the alumina was increased to 4%, negligible increase in compressive strength was achieved. The remarkable increase in compressive strength using such a small amount of the alumina of the present invention is a totally unexpected result.

Figure 2:
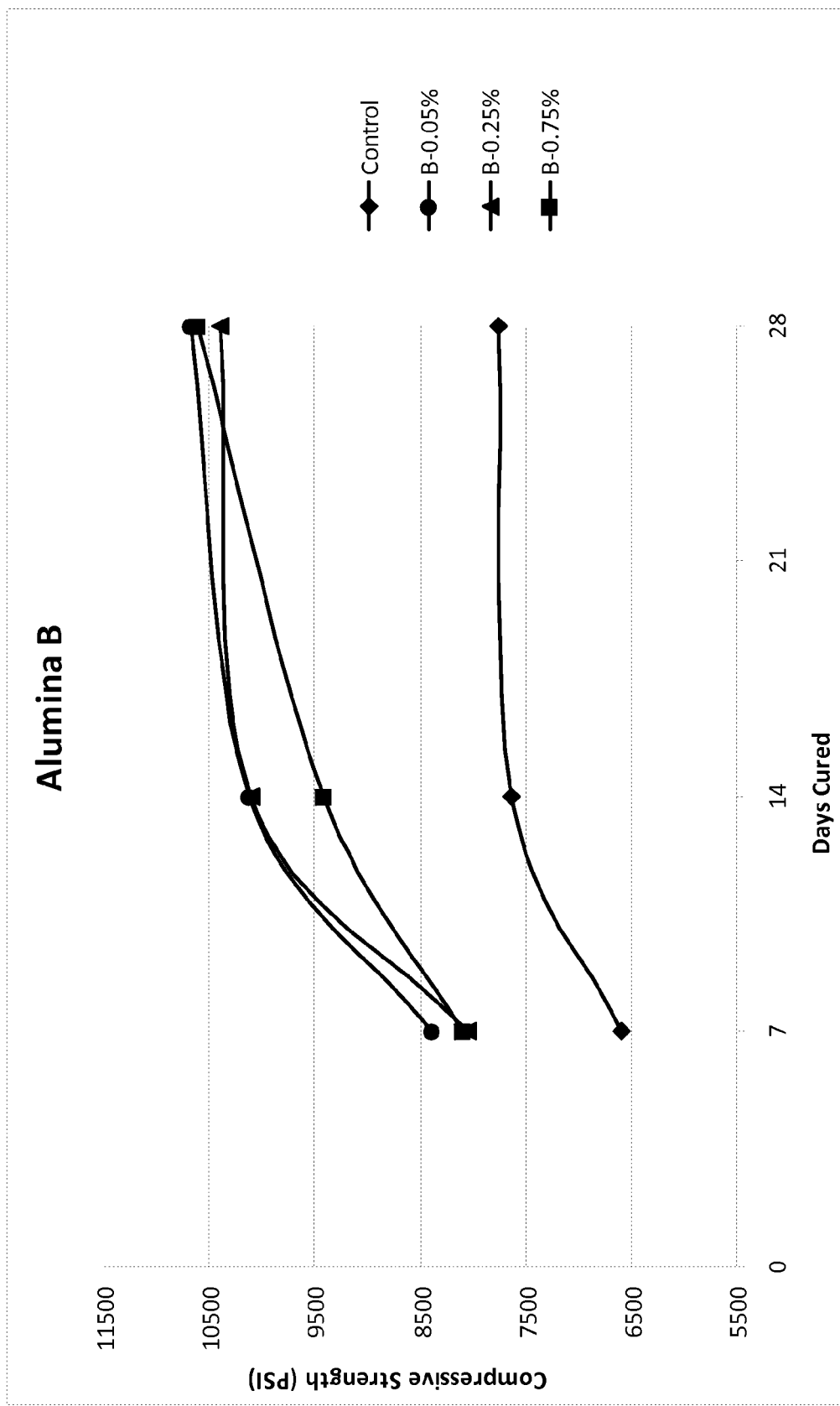
FIG. 2 is a graph similar to FIG. 1 depicting the use of a different nano-sized alumina.

Referring now to FIG. 2, there is shown the effect of various amounts of Alumina B on the compressive strength of the cement. As can be seen in FIG. 2, and unexpectedly, an amount of alumina of about 0.05% by weight in the cement, results in maximum increase in compressive strength. Thus, in the case of Alumina B, the preferred amount present in the alumina would be from about 0.05% to about 0.75% by weight, preferably about 0.05% by weight.

Figure 3:
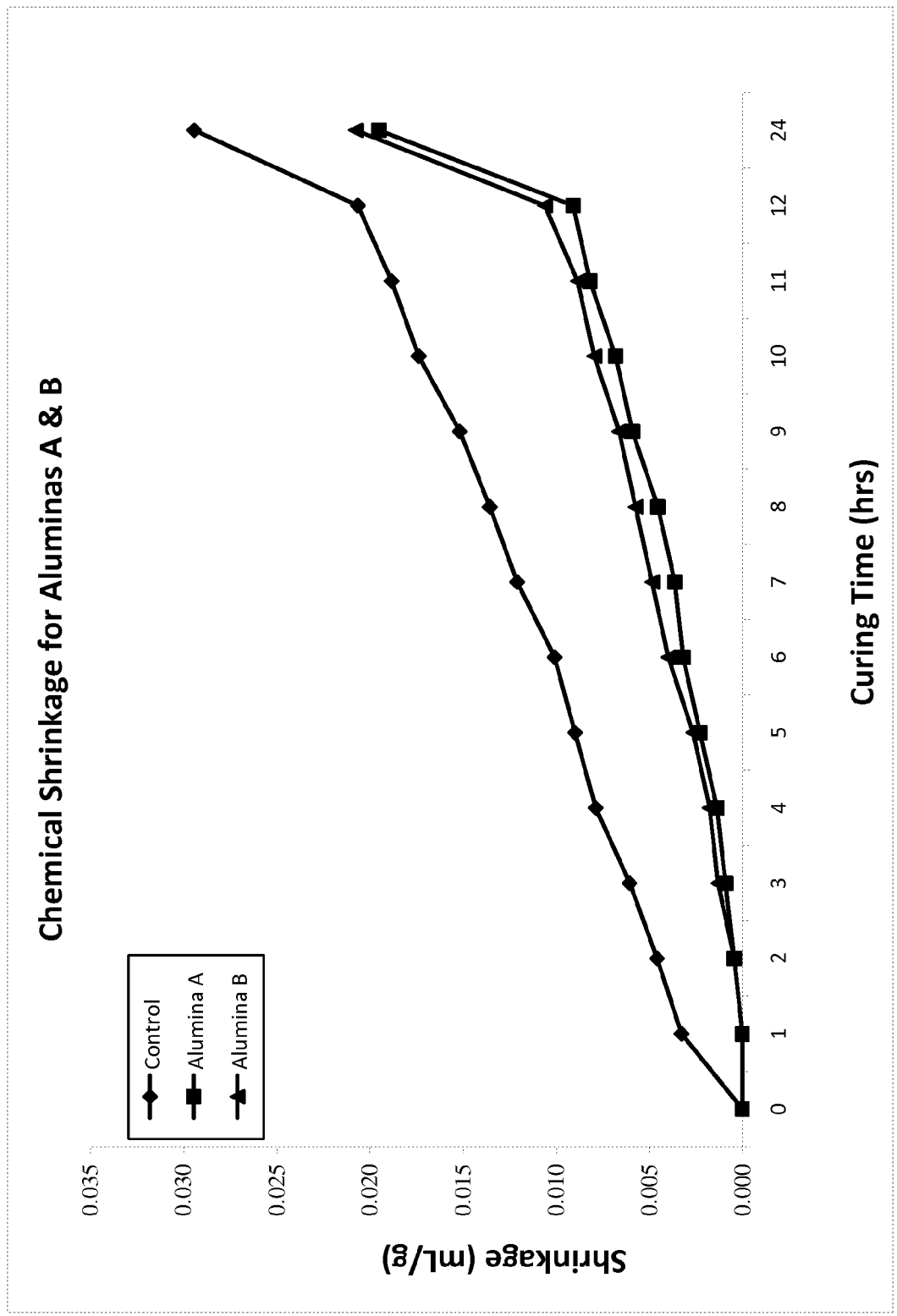
FIG. 3 is a graph showing chemical shrinkage as a function of hours of curing for the two different aluminas at two different concentrations.

FIG. 3 is a graph which depicts chemical shrinkage as a function of hours of curing for optimum amounts of Alumina A alumina and Alumina B alumina versus a control, i.e., a cement with no alumina. As can be seen, with both of the aluminas tested, there is a substantial reduction in the rate of chemical shrinkage as well as total shrinkage, as compared to a control sample containing no alumina. The advantages of less chemical shrinkage have been discussed above and are well appreciated by those skilled in the art.

As can be seen from the above data, certain nano-sized crystalline boehmite alumina particles having the specified surface area, in general, increase the compressive strength of cement and decrease chemical shrinkage rates and total shrinkage, making them cost effective additives to enhance the mechanical properties of cement. In particular, because of the unique combination of degree of crystallinity, surface area, and particle size, the alumina of the present invention can be used in small amounts in cement compositions to achieve marked increases in compressive strength and reduction in chemical shrinkage and shrinkage rates.

Although specific embodiments of the invention have been described herein in some detail, this has been done solely for the purposes of explaining the various aspects of the invention, and is not intended to limit the scope of the invention as defined in the claims which follow. Those skilled in the art will understand that the embodiment shown and described is exemplary, and various other substitutions, alterations and modifications, including but not limited to those design alternatives specifically discussed herein, may be made in the practice of the invention without departing from its scope.

What is claimed is:

1. A composition of matter comprising:
   cement; and
   an effective amount of a boehmite alumina having an average crystallite size on the plane of from about 2 nm to about 80 nm.

2. The composition of claim 1, wherein the boehmite alumina has a content of non-crystalline alumina of less than about 25 mol % based on total aluminum.

3. The composition of claim 1, further comprising:
   a metal oxide selected from the group consisting of silicon oxide, calcium oxide, magnesium oxide, or mixtures thereof.

4. The composition of claim 1, wherein the boehmite alumina has an agglomerated particle size of less than 350 nm as measured in water.

5. The composition of claim 1, wherein said boehmite alumina has a calcined surface area of from about 2 $m^2$/g to about 300 $m^2$/g and a purity of greater than about 99% by weight.

6. The composition of claim 5, wherein said boehmite alumina has a calcined surface area of from about 35 $m^2$/g to about 275 $m^2$/g.

7. The composition of claim 1, wherein said boehmite alumina has an average crystallite size on the plane of from about 3 nm to about 60 nm.

8. The composition of claim 1, wherein said boehmite alumina is obtained from alkoxide precursors.

9. The composition of claim 1, wherein said boehmite alumina is subjected to hydrothermal aging.

10. The composition of claim 1, wherein said boehmite alumina is dispersible in water.

11. The composition of claim 2, wherein said metal oxides comprise up to 10% by weight of the total boehmite alumina/metal oxide mixture.

12. The composition of claim 1, wherein the boehmite alumina is present in an amount of from about 0.001% to about 1% by weight based on the total weight of the cement.

13. The composition of claim 1, wherein the boehmite alumina is present in an amount of from about 0.05% to about 0.75% by weight based on the total weight of the cement 14. A concrete comprising the composition of claim 1 in an admixture with an aggregate.

15. The concrete of claim 14, wherein the concrete has a water-to-cement ratio of from about 0.28 to about 0.56.

* * * * *

UNITED STATES PATENT AND TRADEMARK OFFICE
CERTIFICATE OF CORRECTION

PATENT NO.        : 9,056,791 B2
APPLICATION NO.   : 14/179264
DATED             : June 16, 2015
INVENTOR(S)       : Steven Baxter et al.

Page 1 of 1

It is certified that error appears in the above-identified patent and that said Letters Patent is hereby corrected as shown below:

In the Claims

At column 5, line 14, please insert --020-- between "the" and "plane".

At column 6, line 2, please change the "m" of "m2/g" from superscript. Please leave only the "2" as superscript.

At column 6, line 5, please insert --20-- between "the" and "plane".

Signed and Sealed this
Thirteenth Day of October, 2015

Michelle K. Lee
*Director of the United States Patent and Trademark Office*